United States Patent
McLaughlin et al.

(10) Patent No.: US 6,772,732 B1
(45) Date of Patent: Aug. 10, 2004

(54) MANUAL THROTTLING APPARATUS

(76) Inventors: John E. McLaughlin, 3 Country La., Lake Grove, NY (US) 11755; Neocles G. Athanasiades, 6 Mayeeck Dr., Setauket, NY (US) 11723; Toh M. Meng, 15 Sunflower Dr., Hauppauge, NY (US) 11788

(*) Notice: Subject to any disclaimer, the term of this patent is extended or adjusted under 35 U.S.C. 154(b) by 0 days.

(21) Appl. No.: 10/647,177

(22) Filed: Aug. 25, 2003

(51) Int. Cl.$^7$ ................................ F02D 9/00

(52) U.S. Cl. ..................................... 123/399

(58) Field of Search ................... 123/337, 399

(56) References Cited

U.S. PATENT DOCUMENTS

| | | | | |
|---|---|---|---|---|
| 5,606,950 A | * | 3/1997 | Fujiwara et al. | 123/399 |
| 5,852,996 A | * | 12/1998 | Nakamura et al. | 123/399 |
| 6,446,600 B1 | * | 9/2002 | Scherer et al. | 123/399 |
| 2004/0069271 A1 | * | 4/2004 | Kanno et al. | 123/399 |

* cited by examiner

*Primary Examiner*—Erick Solis
(74) *Attorney, Agent, or Firm*—Frank L. Hart

(57) ABSTRACT

A manual throttling system for electronically controlling the speed (RPM) of an engine from a remote location relative to the primary engine controls. The engine controlling signals are responsive to rotational speed and direction of rotation of a manual control knob and the frequency of light pulses of an optical encoder.

12 Claims, 2 Drawing Sheets

MANUAL THROTTLING APPARATUS

TECHNICAL FIELD

The subject invention relates to a throttling system of an engine. More particularly, the subject invention relates to a manual throttling system for electronically controlling the speed (RPM) of an engine.

BACKGROUND ART

Heretofore utilize remotely located throttles for electronically controlled engines are basically potentiometers that are moved by hand to increase or decrease the speed (RPM) of an engine.

A basic problem experienced with these heretofore utilized controls is that these potentiometers can be left in an advanced throttle position when the engine is shut down. Therefore, when the engine is started it will not start at idle, but at a higher speed (RPM). This can be dangerous to property and individuals where the engine is in mobile equipment which can undesirably lurch into motion.

Another problem associated with these heretofore utilized controls is that if engine start up is at a higher speed, as opposed to an idle speed, the component wear of the engine parts and associated equipment is exponentially increased.

The present invention is directed to overcome one or more of these problems as set forth above.

DISCLOSURE OF THE INVENTION

A manual throttling system for electronically controlling the speed (RPM) of an engine has a housing, a dial plate, a control knob, a light source, a detector, and a microprocessor. The dial plate has first and second sides, a center and a multiplicity of openings each spaced a selected radial distance from a center of the dial plate and is connected to the housing. The control knob is connected to the housing and to the dial plate at said dial plate center. The dial plate and control knob are rotatable relative to the housing in response to rotating the control knob. The light source is connected to the housing and is positioned on the first side of the dial plate adjacent the dial plate openings. The detector is connected to the housing and is positioned adjacent the second side of the dial plate and adapted to receive light pulses passing from the light source through the dial plate openings and delivering signals "A" and "B" responsive respectfully to the speed and direction of dial plate rotation and frequency of the light pulses. The microprocessor is connected to the detector and is adapted to receive signals "A" and "B" and deliver an engine controlling signal "IC"responsive to the direction and speed of dial plate rotation and the frequency of light pulses.

In another aspect of the invention, a manual throttling system is provided for electronically controlling the speed (RPM) of an engine from a location remote from the primary controls of the engine of a vehicle. The manual throttling system has a housing, a dial plate, a control knob, a light source, a two channel detector and a microprocessor. The housing is remotely positioned from the primary controls of the engine; The dial plate has first and second sides, a center, a multiplicity of openings spaced a preselected radial distance from a center of the dial plate and is rotatably connected to the housing. The control knob is connected to the housing and to the dial plate at the dial plate center. The dial plate and control knob are rotatable relative to the housing and the dial plate is rotatable in response to rotating the control knob. The light source is connected to the housing and positioned on the first side of the dial plate adjacent the dial plate openings. The two channel detector is connected to the housing and is positioned adjacent the second side of the dial plate. The detector is adapted to receive light pulses passing from the light source through the dial plate openings and delivering signals "A" and "B" responsive respectfully to the speed and direction of dial plate rotation and the frequency of light pulses passing through the dial plate openings The signal "A" is out of phase with the signal "B". The microprocessor is connected to the detector and is adapted to receive signals "A" and "B" and deliver an engine speed controlling signal "C" response to the direction and speed of dial plate rotation and the frequency of light pulses. The microprocessor is adapted to automatically reset the engine controlling speed to idle speed of the engine in response to shutting down the engine.

BEST MODE FOR CARRYING OUT THE INVENTION

Figure 1:
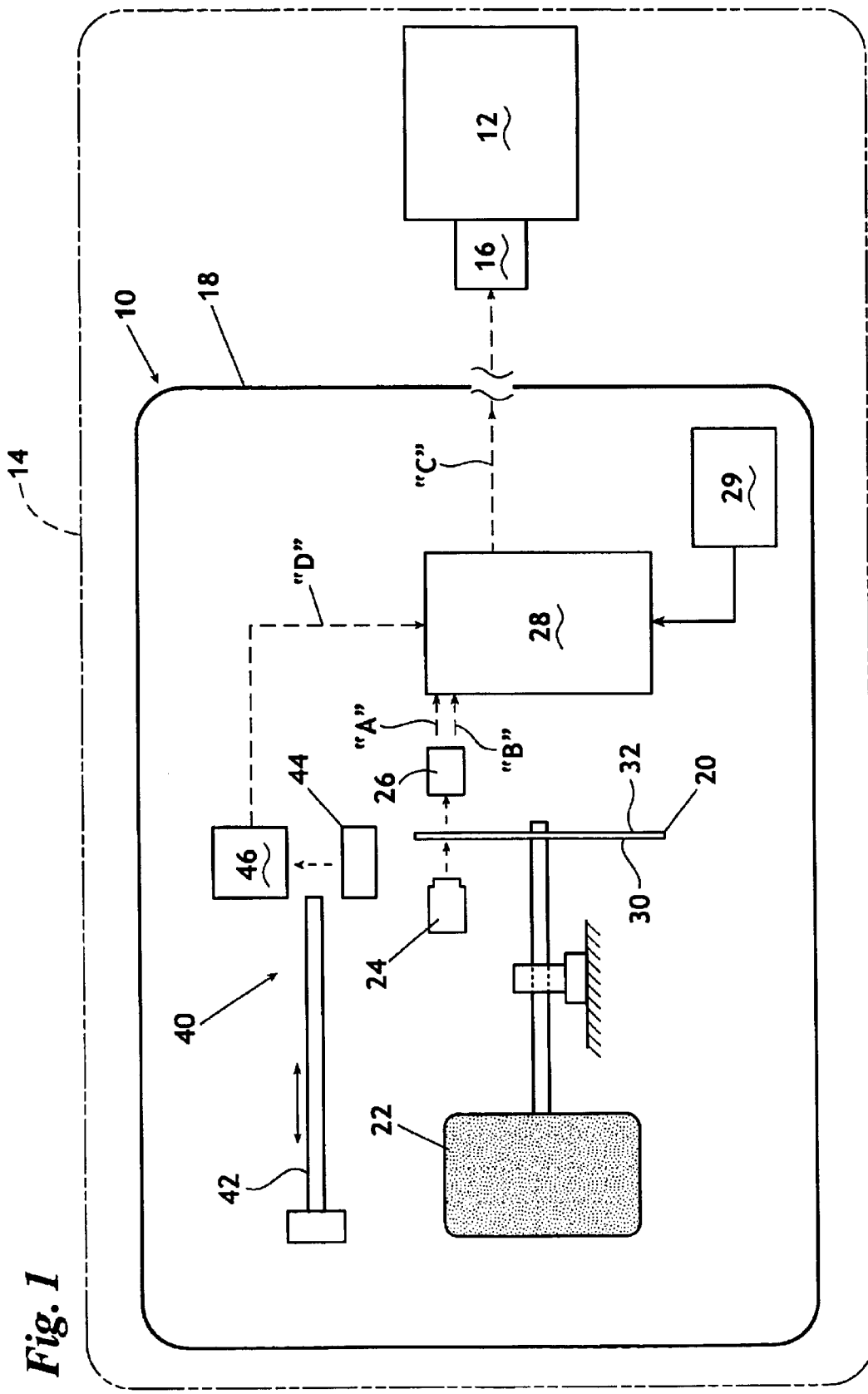
FIG. 1 is a diagrammatic schematic view of the manual throttling system of this invention.
Figure 2:
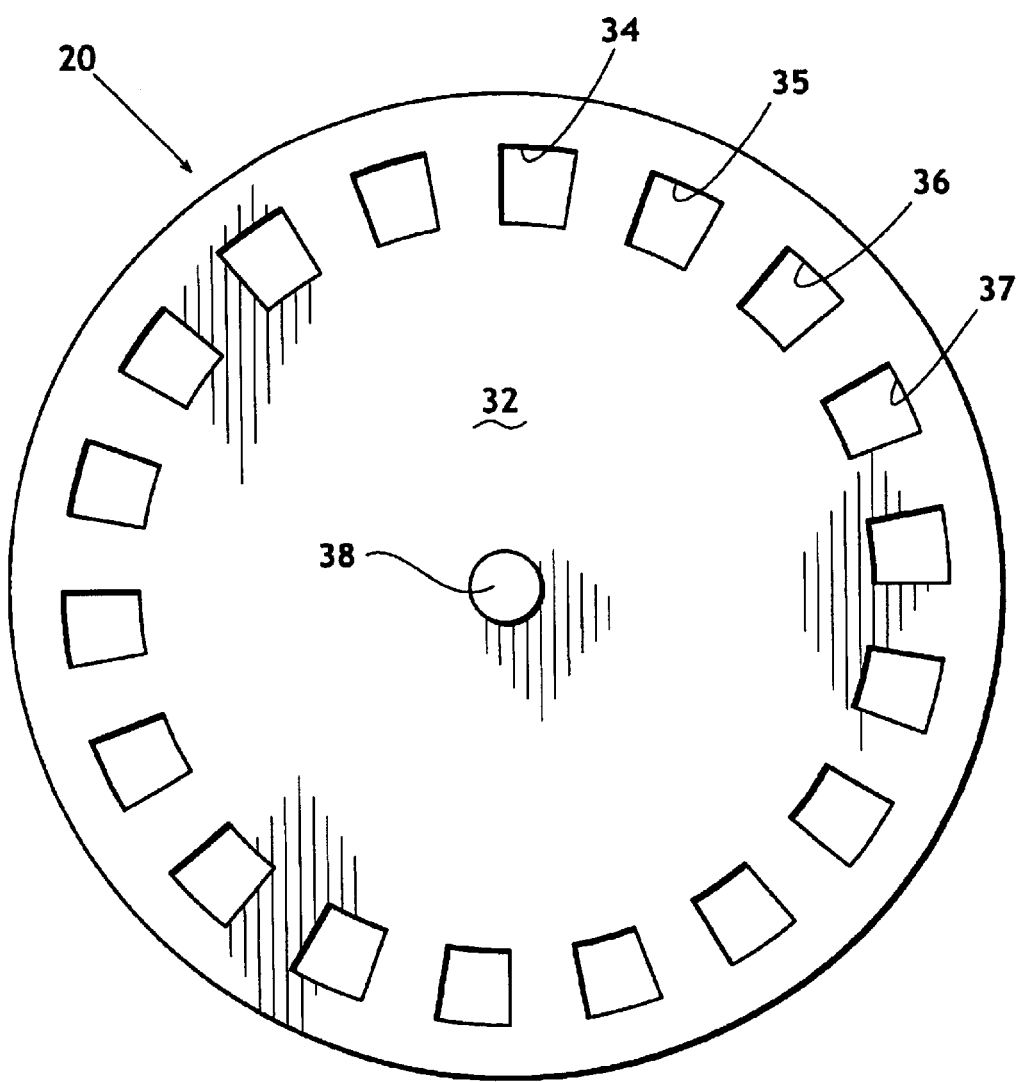
FIG. 2 is a frontal view of the dial plate of this invention.

Referring to FIGS. 1 and 2, a manual throttling system 10 of this invention is shown for electronically controlling the speed (RPM) of an engine 12 of a vehicle 14. The throttling system 10 is generally located at a remote location relative to the primary speed controls 16 of the engine 12. A particularly advantages use of this invention is for controlling the engine speed of a fire truck.

The throttling system 10 has a housing 18, a dial plate 20, a control knob 22, a light source 24, a detector 26, a microprocessor 28, and an electrical power source connected to the microprocessor 28 and associated elements.

The dial plate 20 (see FIG. 2) has first and second sides 30, 32, a multiplicity of openings 34–37 each spaced a radial distance from a center of the dial plate and from one another. The dial plate 20 is rotatably connected to the housing 18.

For purposes of simplicity, only a few of the dial plate openings 34–37 have been shown in detail and the connections of the dial plate 20, control knob 22, light source 24, detector 26 and microprocessor 28 to the housing 18 have not been shown The construction of these openings 34–37 and connections to the housing 18 are well known in the art, and can be determined without undue effort of an inventive nature by one skilled in the art.

The control knob 22 is rotatably connected to the housing and is fixedly connected to the dial plate 20 at the center 36 of the dial plate 20. The dial plate 20 and control knob 22 are rotatable relative to the housing 18 and the dial plate 20 is rotatable in response to manual rotation of the control knob 22.

The light source 24 is connected to the housing 18 and is positioned on the first side 30 of the dial plate 20 at a location adjacent the dial plate openings 34–37.

The detector 26 is connected to the housing and is positioned adjacent the second side 32 of the dial plate 20. The detector is adapted to receive light pulses passing from the light source 24, passing through the dial plate openings 34–37 and delivering signals "A" and "B" responsive respectfully to the speed and direction of dial plate rotation and the frequency of the light pulses. The light pulses are generated in response to rotation of the dial plate 20 where the light intermittently passes through the dial openings and intermittently is block from the detector 26 during rotation. The signal "A" is out of phase with signal "B". The microprocessor 28 is adapted to determine the direction of rotation of the control knob 22 and dial plate 20 in response to the phase difference between said signals "A" and "B".

The light source 24, dial plate 20 and detector 26 are collectively known as an optical encoder. The detector 26 is also known as a Transmissive Encoder Sensor which preferably has two channels and is of the type sold by the Honeywell company and is listed in their catalog as HOA0902.

The microprocessor 28 is connected to the detector 26 and is adapted to receive signals "A" and "B" and deliver to the engine 12 an engine speed controlling signal "C" responsive to the direction and speed of dial plate rotation and the frequency of light pulses.

The microprocessor 28 is adapted to automatically reset the engine controlling signal "C" to idle speed of the engine 12 in response to shutting down the engine 12. The engine speed can also be reduce to idle speed by switch 40. Switch 40, particularly a manually operated position sensing switch, is connected to the housing 18 and to the microprocessor 28 and is adapted to deliver a signal "D" to the microprocessor 28 and responsively reduce the engine speed to idle. The position sensing switch 40 includes an actuation button or rod 42 moveable into the pathway of light passing from slight source 44 to detector 46. Upon moving the rod 42 into a blocking position of light source 44, signal "D" is delivered and the speed of the engine is reduced to idle speed.

Industrial Applicability

In the operation of the apparatus of this invention, the speed of an engine is controlled at a remote location relative to primary engine speed controls 16. Upon start up of the engine 12, the speed is normally controlled and maintained at idle speed.

The microprocessor is programmed to change the speed of the engine at a rate relative to the rate of rotation of the control knob 22 and associated dial plate 20, as described above.

During engine operation, rotation of the dial plate 20 in a first direction will cause the speed of the engine to increase and rotation of the dial plate in a second direction will cause the speed of the engine to decrease.

Upon shutting down the engine, the microprocessor 28 will automatically control the engine for a subsequent idle speed start up and increase in engine speed is in response to rotation of the control knob 22 and associated dial plate 20.

Other aspects, objects, and advantages of this invention can be obtained from a study of the drawings, the disclosure, and the appended claims.

| Element list |
| --- |
| 10 throttling system |
| 12 engine |
| (14) vehicle |
| 16 primary speed controls |
| 18 housing |
| 20 dial plate |
| 22 control knob |
| 24 light source |
| 26 detector |

| -continued |
| --- |
| Element list |
| 28 microprocessor |
| 29 power source |
| 30 first side of 20 |
| 32 second side of 20 |
| 34–37 openings of 20 |
| 36 center of 20 |
| 40 position switch |
| 42 rod of 40 |
| 44 light source of 40 |
| 46 detector of 40 |

What is claimed is:

1. A manual throttling system for electronically controlling the speed (RPM) of an engine, comprising:

a housing;

a dial plate having first and second sides, a center, a multiplicity of openings each spaced a selected radial distance from a center of the dial plate and being connected to the housing;

a control knob connected to the housing and to the dial plate at said dial plate center, said dial plate and control knob being rotatable relative to the housing and said dial plate being rotatable in response to rotation of the control knob;

a light source connected to the housing and being positioned on the first side of the dial plate adjacent the dial plate openings;

a detector connected to the housing and being positioned adjacent the second side of the dial plate and being adapted to receive light pulses passing from the light source through the dial plate openings and delivering signals (A) and (B) responsive respectfully to the speed and direction of dial plate rotation and frequency of the light pulses; and a microprocessor connected to the detector and being adapted to receive signals (A) and (B) and deliver an engine speed controlling signal (C) responsive to the direction and speed of dial plate rotation and the frequency of light pulses.

2. A throttling system, as set forth in claim 1, wherein the dial plate, the light source, and the detector comprise an optical encoder.

3. A throttling system, as set forth in claim 2, wherein the detector of the encoder is a two channel detector.

4. A throttling system, as set forth in claim 1, wherein the detector is a two channel detector, each channel producing a respective digital signal (A) and (B) with said signal (A) being out of phase with said signal (B).

5. A throttling system, as set forth in claim 4, wherein the microprocessor is adapted to determine the direction of rotation of the control knob and dial plate in response to the phase difference between said signals (A) and (B).

6. A throttling system, as set forth in claim 5, wherein the microprocessor is adapted to change the speed of the engine at a rate relative to the rate of rotation of the dial plate.

7. A throttling system, as set forth in claim 5, wherein the microprocessor is adapted to increase the speed of the engine in response to rotation of the dial plate in a first direction and decrease the speed of the engine in response to rotation of the dial plate in an opposed second direction.

8. A throttling system, as set forth in claim 7, wherein the microprocessor is adapted to change the speed of the engine at a rate responsive to the rate of rotation of the dial plate.

9. A throttling system, as set forth in claim 1, including a switch connected to the housing and to the microprocessor and being adapted to deliver a signal (D) to the microprocessor and responsively reducing the engine speed to an idling speed.

10. A throttling system, as set forth in claim 9, wherein said switch is a position-sensing switch.

11. A manual throttling system for electronically controlling the speed (RPM) of an engine from a location remote from the primary controls of the engine of a vehicle, comprising:

- a housing remotely positioned from primary controls of the engine;
- a dial plate having first and second sides, a center, a multiplicity of opening spaced a preselected radial distance from a center of the dial plate and being rotatably connected to the housing;
- a control knob is connected to the housing and to the dial plate at the dial plate center, said dial plate and control knob being rotatable relative to the housing and said dial plate being rotatable in response to rotation of the control knob;
- a light source connected to the housing and positioned on the first side of the dial plate adjacent the dial plate openings;
- a two channel detector connected to the housing and being positioned adjacent the second side of the dial plate and adapted to receive light pulses passing from the light source through the dial plate openings and delivering signals (A) and (B) responsive respectfully to the speed and direction of dial plate rotation and the frequency of light pulses, said signal (A) being out of phase with said signal (B); and
- a microprocessor connected to the detector and being adapted to receive signals (A) and (B) and deliver an engine speed controlling signal (C) responsive to the direction and speed of dial plate rotation and the frequency of light pulses, said microprocessor being adapted to automatically resetting the engine controlling signal (C) to idle speed of the engine in response to shutting down the engine.

12. A throttling system, as set forth in claim 11, wherein the microprocessor is adapted to determine the direction of rotation of the control knob and dial plate in response to the phase difference between said signals (A) and (B) and the direction of rotation of the control knob and dial plate increases the speed of the engine in response to rotation in a first direction and decreases the speed of the engine in response to rotation in a second direction.

* * * * *